United States Patent
Geier et al.

(10) Patent No.: US 11,020,832 B2
(45) Date of Patent: Jun. 1, 2021

(54) CLAMPING SYSTEM FOR ABUTMENT BLANK

(71) Applicant: ZFX GMBH, Dachau (DE)

(72) Inventors: Andreas Geier, Gargazon (IT); Michael Schmerling, St. Leonhard (IT)

(73) Assignee: Zfx GmbH, Dachau (DE)

( * ) Notice: Subject to any disclaimer, the term of this patent is extended or adjusted under 35 U.S.C. 154(b) by 185 days.

(21) Appl. No.: 16/304,612

(22) PCT Filed: Jun. 10, 2016

(86) PCT No.: PCT/EP2016/063291
§ 371 (c)(1),
(2) Date: Nov. 26, 2018

(87) PCT Pub. No.: WO2017/211427
PCT Pub. Date: Dec. 14, 2017

(65) Prior Publication Data
US 2019/0217432 A1   Jul. 18, 2019

(51) Int. Cl.
*B23Q 3/06* (2006.01)
*A61C 8/00* (2006.01)
*A61C 13/00* (2006.01)

(52) U.S. Cl.
CPC ............... *B23Q 3/062* (2013.01); *A61C 8/005* (2013.01); *A61C 13/0003* (2013.01);
(Continued)

(58) Field of Classification Search
CPC ..... B25B 11/00; B23Q 3/062; A61C 13/0003; A61C 13/0004; A61C 13/0006; A61C 13/00022; A61C 8/005
(Continued)

(56) References Cited

U.S. PATENT DOCUMENTS 8,820,726 B2 * 9/2014 Yeom ..................... A61C 13/12
269/55
9,421,653 B2 * 8/2016 Suyama ................... B23C 3/16
(Continued)

FOREIGN PATENT DOCUMENTS

DE    202008006553 U1    7/2008
WO    WO-2017211427 A1   12/2017

OTHER PUBLICATIONS

"International Application Serial No. PCT/EP2016/063291, International Search Report dated Feb. 2, 2017", 3 pgs.
(Continued)

*Primary Examiner* — Lee D Wilson
*Assistant Examiner* — Alberto Saenz
(74) *Attorney, Agent, or Firm* — Schwegman Lundberg & Woessner, P.A.

(57) ABSTRACT

Systems and methods including an abutment blank clamping system for securing a abutment blank are disclosed. According to one example, the abutment blank clamping system includes an abutment holder including a base portion and an elongate clamping portion extending from a first end adjacent the base portion to a second end. The elongate clamping portion includes at least one bore extending from a first side surface defining a first opening to a second side surface defining a second opening, and at least one projection extending from the second side surface positioned adjacent to the second opening, the at least one projection configured to engage with the abutment blank.

14 Claims, 4 Drawing Sheets

(52) U.S. Cl.
CPC ...... *A61C 13/0004* (2013.01); *A61C 13/0006* (2013.01); *A61C 13/0022* (2013.01)

(58) Field of Classification Search
USPC ..... 269/45, 136, 137, 138, 287, 289 R, 309, 269/310
See application file for complete search history.

(56) References Cited

U.S. PATENT DOCUMENTS

| | | |
|---|---|---|
| 2013/0157222 A1 | 6/2013 | Yeom |
| 2015/0071724 A1 | 3/2015 | Suyama et al. |

OTHER PUBLICATIONS

"International Application Serial No. PCT/EP2016/063291, Written Opinion dated Feb. 2, 2017", 5 pgs.
"European Application Serial No. 16728051.0, Response filed Aug. 16, 2019 to Office Action dated Feb. 6, 2019", 3 pgs.

* cited by examiner

CLAMPING SYSTEM FOR ABUTMENT BLANK

This application is a U.S. National Stage Application under 35 U.S.C. 371 from International Application Serial No. PCT/EP2016/063291, filed on Jun. 10, 2016, and published as WO 2017/211427 A1 on Dec. 14, 2017, the benefit of priority of which is claimed hereby, and which is incorporated by reference herein in its entirety.

TECHNICAL FIELD

The present subject matter relates to clamping systems and methods for holding a dental abutment blank and, more particularly, to clamping systems and methods for holding a plurality of the dental abutment blanks to an abutment holder during milling to form implant abutments.

BACKGROUND

There are numerous possible ways in the dental industry of producing various parts which form a dental prosthesis. A variant in that respect is the manual production of various parts. In recent times, entire machining devices are also used, with which dental prosthesis parts are produced automatically or semi-automatically. A particular area in that respect is the production of abutments which form a connecting portion between a dental implant serving as tooth root prosthesis and the crown which is later visible. Such an abutment forms the transition between the soft tissue (gum) relative to the oral cavity and the tooth crown. Often such abutments are fitted releasably in the actual dental implant. Abutments can be made from materials including, but not limited to, titanium, aluminum oxide or zirconium dioxide.

A common manufacturing device is a computer numeric control (CNC) machine, which can have various machining heads or grinding, milling or the like. When manufacturing an abutment with a CNC machine, an abutment blank (e.g., the workpiece) can be attached to a table of the CNC machine via an abutment holder.

OVERVIEW

The present inventors recognize, among other things, an opportunity for increasing the precision in coupling abutment blanks to an abutment holder, increasing the processing ability of milling tool, and increasing the number of abutments blanks that can be coupled to the abutment holder. More particularly, the present inventors recognize that it can be difficult to accurately mount abutment blanks to the abutment holder such that the position of each abutment blank has the same orientation. In previous approaches, abutment blanks coupled to holders can have variances between their positions with respect to the abutment holder and to other abutment blanks such variances can decrease the precision of the milling and result in defective parts.

The present inventors have recognized that such positioning errors can be reduced by creating an abutment holder that has only one position for mounting the abutment blank to the abutment holder. Further, the initial attachment has a low mechanical tolerance between the abutment blank and the abutment holder therefore the position of the abutment blank is the substantially the same every time and a touch probe of a milling machine is not needed. A touch probe is a high-end measuring device, which can be used in a milling machine and measures each position related to the machining zero point inside the working room. Touch probes need a lot of space in the machine, they are expensive, and the measuring takes a lot of time. Therefore, by providing an abutment holder that has precise positioning of abutment blanks, the touch probe is not needed.

Further, the abutment holder of the present invention provides a simple and fast mechanism for clamping the abutment blanks to the abutment holder and allows for multiple milling processing of multiple (e.g., 12) abutment blanks with 5x simultan strategies. Previous approaches have generally been limited to three-axis milling. That is, the milling tool moves in the x, y, or z axis. However, having the axis limitation can limit the abutment design.

The present inventors have recognized that such limitations can be overcome by creating the abutment holder of the present disclosure such that the milling tool can move around the diameter of the blanks and on the side of the implant geometry. This allows for 5x simultan strategies, where each axis of movement can be implemented by either by moving the table and/or the tool in various axises.

To further illustrate the apparatuses and methods disclosed herein, the following non-limiting examples are provided:

In Example 1, an abutment blank clamping system for securing an abutment blank includes:
an abutment holder including a base portion and an elongate clamping portion extending from a first end adjacent the base portion to a second end, the elongate clamping portion, including:
  at least one bore extending from a first side surface defining a first opening to a second side surface defining a second opening; and
  at least one projection extending from the second side surface positioned adjacent to the second opening, the at least one projection configured to engage with the abutment blank.

In Example 2, Example 1 can optionally be configured where the at least one projection includes a first projection, a second projection, and a third projection, the first, second, and third projections positioned around the second opening.

In Example 3, Example 2 can optionally be configured where the first projection and the second projection are diametrically opposed from each other.

In Example 4, Example 3 can optionally be configured where the third projection is positioned between and equidistant from the first projection and the second projection.

In Example 5, any one of Examples 1-4 can optionally be configured where the second side surface is a flat surface extending along the elongate clamping portion from the first end to the second end.

In Example 6, any one of Examples 1-5 can optionally be configured where the at least bore includes a plurality of bores extending from the first side surface to the second side surface, the plurality of bores spaced apart along a longitudinal axis of the abutment holder.

In Example 7, any one of Examples 1-6 can optionally include a fastener including an engagement head and a threaded shaft, the fastener configured to extend through the at least one bore and releasably couple with an abutment blank.

In Example 8, any one of Examples 1-7 can optionally be configured where the at least one projection is integral with the elongate clamping portion.

In Example 9, any one of Examples 1-8 can optionally be configured where the at least one projection is a pin coupled to the elongate clamping portion.

In Example 10, any one of Examples 1-9 can optionally include an abutment blank having a body extending from a contact end to an implant engaging end, the abutment blank including at least one positioning groove and an engagement bore extending from the contact end toward the implant engaging end.

In Example 11, Example 10 can optionally be configured where the at least one positioning groove is configured to receive the at least one projection and the engagement bore is configured to releasably couple with the abutment blank.

In Example 12, an abutment blank clamping system for securing an abutment blank includes:

an abutment holder including a base portion and an elongate clamping portion extending from a first end adjacent the base portion to a second end, the elongate clamping portion, including:
  a first bore extending from a first engagement surface defining a first engagement opening to a first receiving surface defining a first receiving opening;
  a second bore extending from a second engagement surface defining a second engagement opening to a second receiving surface defining a second receiving opening;
  a third bore extending form a third engagement surface defining a third engagement opening to a third receiving surface defining a third receiving opening; and
  at least one projection positioned adjacent to each of the first, second, and third engagement openings, each projection configured to engage with a corresponding abutment blank; and
a plurality of fasteners configured to extend through the first, second, and third bores and releasably couple with the corresponding abutment blanks.

In Example 13, Example 12 can optionally be configured where the abutment holder has a longitudinal axis and along a cross-section of the elongate clamping portion perpendicular to the longitudinal axis the first, second, and third engagement surfaces are flat surfaces and the first, second, and third receiving surfaces are curved surfaces and, wherein each engagement surface is positioned between two receiving surfaces.

In Example 14, any one of Examples 12-13 can optionally be configured where the first, second, and third bores are spaced apart along a longitudinal axis of the abutment holder.

In Example 15, any one of Examples 12-13 can optionally be configured to further include at least one abutment blank having a body extending from a contact end to an implant engaging end, the abutment blank including at least one positioning groove and an engagement bore extending from the contact end toward the implant engaging end.

In Example 16, any one of Examples 12-13 can optionally be configured where, when the at least one projection of the first bore engages with the at least one positioning groove, the first engagement opening is concentric with the engagement bore.

In Example 17, any one of Examples 12-13 can optionally be configured where the at least one positioning groove is configured to receive the at least one projection and the engagement bore is configured to releasably couple with the abutment blank.

In Example 18, any one of Examples 12-13 can optionally be configured where the at least projection includes three projections and the at least one positioning groove includes three positioning grooves, wherein the orientation of the three projections adjacent to the first, second, and third engagement surfaces corresponds to the orientation of the three positioning grooves of the corresponding abutment blanks.

In Example 19, a method for fabricating an implant abutment includes:
  engaging a positioning groove of an abutment blank with a projection extending from a elongate clamping portion of a abutment holder, the abutment holder including at least one bore extending from a first side surface defining a first opening to a second side surface defining a second opening, the projection extending from the second side surface;
  inserting a fastener through the bore such that a threaded shaft of the fastener engages with an engagement bore of the abutment blank;
  coupling the abutment holder to a milling machine; and
  milling the abutment blank to form the implant abutment.

In Example 20, Examples 19 can optionally be configured where the abutment holder includes a base portion and an elongate clamping portion extending from a first end adjacent the base portion to a second end, the elongate clamping portion, including:
  at least one bore extending from a first side surface defining a first opening to a second side surface defining a second opening; and
  at least one projection extending from the second side surface positioned adjacent to the second opening, the at least one projection configured to engage with the abutment blank.

In Example 21, the systems or methods of any one or any combination of Examples 1-20 can optionally be configured such that all elements or options recited are available to use or select from.

These and other examples and features of the present apparatuses and methods will be set forth in part in the following Detailed Description. This Overview is intended to provide non-limiting examples of the present subject matter—it is not intended to provide an exclusive or exhaustive explanation. The Detailed Description below is included to provide further information about the present apparatuses and methods.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

DETAILED DESCRIPTION

The present application relates to clamping systems for holding a plurality of abutment blanks. The clamping system can hold the plurality of abutment blanks to an abutment holder during milling for forming an abutment.

The term "abutment blank" is used herein to refer to all types of implant abutment structures affixed to the implant and between the implant and a crown or coping. The abutment blank can be a single, monolithic structure, or can be formed by more than one piece and will be milled, machined, or fabricated into a predetermined shape. Abutment blank as used herein refers to abutments blanks that either include or do not include the prefabricated implant interface geometry that mates with the implant.

Figure 1:
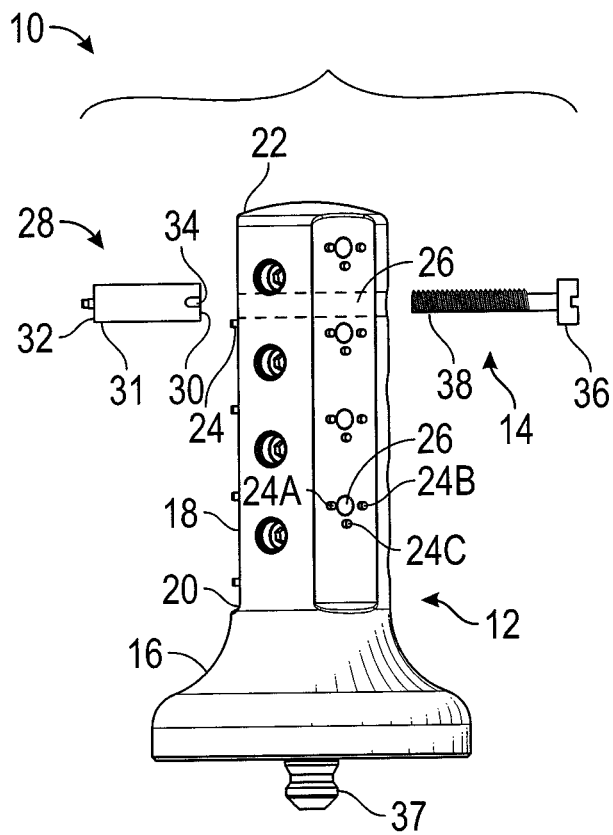
FIG. 1 is a perspective view of an abutment blank clamping system according to an example of the present application.

FIG. 1 illustrates an abutment blank clamping system 10 for securing an abutment blank 28. The abutment blank clamping system 10 can include an abutment holder 12, an abutment blank 28, and a fastener 14. The abutment holder 12 includes a base portion 16 and an elongate clamping portion 18 extending from a first end 20 of the elongate clamping portion 18 to a second end 22 of the elongate clamping portion 18. The abutment holder 12 can include at least one bore 26 extending through the elongate clamping portion 18 from a first side surface to a second side surface opposite the first side surface. The first side surface can define a first opening configured to receive the fastener 14 and the second side surface can define a second opening. The second side surface can include at least one projection 24 extending from the second side surface positioned adjacent to the second opening. The at least one projection 24 is configured to engage with the abutment blank 28. As seen in FIG. 1, the elongate clamping portion 18 can include three projections 24A-C (collectively referred to herein as "projections 24" or generally "projection 24").

The abutment blank 28 includes a body 31 extending from a contact end 30 to an implant engaging end 32. The abutment blank 28 includes at least one positioning groove 34 that is configured to engage with a projection 24. The fastener 14 includes an engagement head 36 and a threaded shaft 28. As discussed herein, the fastener 14 can extend through the bore 26 and engage with an engagement bore (as shown as "62" in FIG. 5A) of the abutment blank 28 to couple the abutment blank 28 to the abutment holder 12.

FIG. 1 also illustrates a workpiece projection 37 that can be used to couple the abutment holder 12 to a table of the machine (e.g., a milling machine). The attachment projection 37 can be a formed integral with the abutment holder 12 or as a separate component that can be releasably coupled to the abutment holder 12. For example, once the abutment blanks 28 are attached to the abutment holder 12 the workpiece projection 27 can be coupled to the base 16 of the abutment holder 12.

Figure 2A:
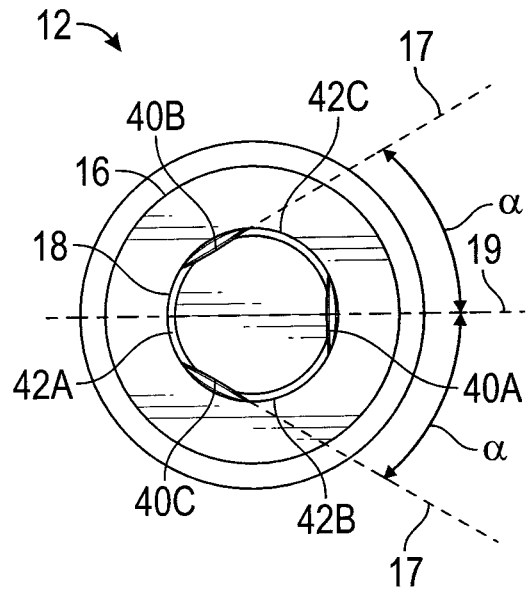
FIG. 2A is a top view of an abutment holder according to an example of the present application.

FIG. 2A is a top view of an abutment holder 12. In an example, the periphery (or cross-section) of the elongate clamping portion 18 includes three engagement surfaces 40A, 40B, and 40C (referred to herein collectively as "engagement surfaces 40" or generally "engagement surface 40") and three receiving surfaces 42A, 42B, and 42C (referred to herein collectively as "receiving surfaces 42" or generally "receiving surface 42"). While three engagement surfaces 40 and three receiving surfaces 42 are shown, the elongate clamping portion 18 can include more or less engagement and receiving surfaces 40, 42. In an example, the number of engagement surfaces 40 can equal the number of receiving surfaces 42.

In an example, the engagement surfaces 40 are substantially flat surfaces such that when the engagement surface 40 engages with an abutment holder they can be substantially flush with each other. For example, the contact surface 30 of the abutment blank 28 is also flat (as shown in FIG. 1). The receiving surfaces 42 are shown as curved surfaces, however, other surface shapes can be used (e.g., triangle, flat, etc.). In an example, the receiving surfaces 42 can have a shape that is different from the engagement surfaces 40 to aid a user in determining which surface is configured to engage with the abutment blank and which surface is configured to receive the fastener.

In an example, a line 17 tangent to one engagement surface 40 (e.g., either engagement surface 40B or 40C) can form an angle α with respect to a midline 19 of an adjacent engagement surface 40A. In an example, angle α can be 30 degrees; however, other angles can be used. When the elongate clamping portion 18 includes three engagement surfaces 40 and three receiving surfaces 42, a first engagement surface 40A can be directly opposite a first receiving surface 42A, a second engagement surface 40B can be directly opposite a second receiving surface 42B, and a third engagement surface 40C can be directly opposite a third receiving surface 42B. In an example, the engagement surfaces 40 are positioned equidistant from each other and the receiving surfaces 42 are positioned equidistant from each other. In an example, the length of each engagement surfaces 40 are equal to each other and the length of each receiving surfaces 42 are equal to each other. However, in various examples, the length of each engagement surface 40 and/or and the length of each receiving surface 42 can vary.

Figure 2B:
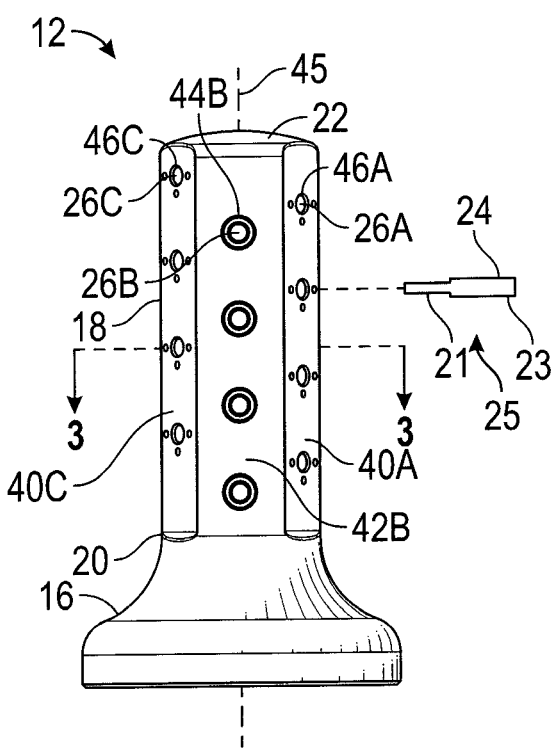
FIG. 2B is a perspective view of the abutment holder of FIG. 2A including a pin according to an example of the present application.
Figure 2C:
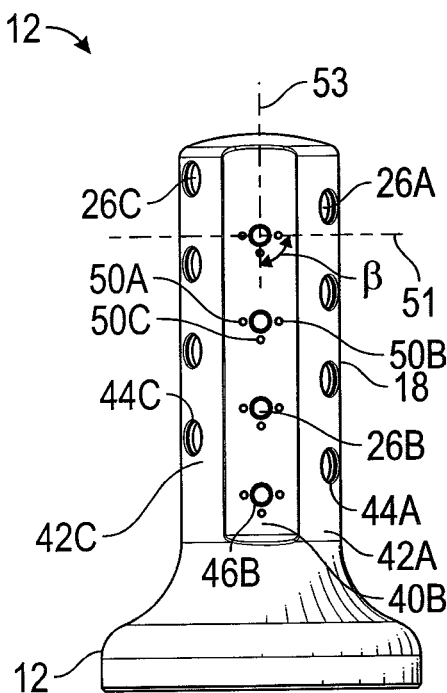
FIG. 2C is a perspective view of the abutment holder of FIG. 2B rotated 180 degrees including a pin according to an example of the present application.

FIG. 2B is a perspective view of the abutment holder 12 of FIG. 2A and FIG. 2C is a perspective view of the abutment holder of FIG. 2B rotated 180 degrees. As seen in FIGS. 2B and 2C, the elongate clamping portion 18 includes a plurality of bores 26A-C (collectively referred to herein as "bores 26" or generally "bore 26") and each engagement surface 40 and each receiving surface 42 defines a plurality of openings. The engagement surfaces 40A-C and the receiving surfaces 42A-C each extend from the first end 20 of the elongate clamping portion 18 to the second end 22 of the elongate clamping portion 18.

In an example, the engagement surfaces 40A-C define engagement openings 46A-C (collectively referred to herein as "engagement openings 26" or generally "engagement opening 26") and the receiving surfaces 42A-C define receiving openings 44A-C (collectively referred to herein as "receiving openings 44" or generally "receiving opening 44"). Bore 26A extends from a first engagement opening 46A defined by a first engagement surface 40A to a first receiving opening 44A defined by a first receiving surface 42A. Bore 26B extends from a second engagement opening 46B defined by a second engagement surface 40B to a second receiving opening 44B defined by a second receiving surface 42B. Bore 26C extends from a third engagement opening 46C defined by a third engagement surface 40C to a third receiving opening 44C defined by a third receiving surface 42C. As shown in FIGS. 2B and 2C, each set of opposing surfaces (e.g., 40A/42A; 40B/42B; and 40C/43C) include four bores 26. Thus, in the example shown twelve abutment blanks can be coupled to the abutment holder 12 for processing. However, depending on the space available and size of the elongate clamping portion 18 the number of bores can vary. For example, each set of opposing surfaces can include one bore 26 or more than four bores 26.

In an example, each bore 26 along a set of opposing surfaces (e.g., bores 26A extending between engagement surface 40A and receiving surface 42A) are spaced apart from each other and staggered along a longitudinal axis 45 of the abutment holder 12 (as shown in FIG. 2B). Moreover, the bores 26 extending between a first set of opposing surfaces are spaced part from and staggered along the longitudinal axis 45 with respect to the bores 26 of other sets of opposing surfaces (e.g., a second and third set of opposing surfaces). For example, bores 26A (extending between opposing surfaces 40A/42A), bores 26B (extending between opposing surfaces 40B/42B), and bores 26C (extending between opposing surfaces 40C/42C) are spaced apart from each other and do not intersect.

As discussed herein, the elongate clamping portion 18 can include a projection 24 that is configured to engage with a positioning groove 34 of an abutment blank 28 (as shown in FIG. 1). The projections 24 can be positioned adjacent to the engagement openings 46A-C defined by the engagement surfaces 40A-C.

In one example, the at least on projection 24 can be formed integral with the elongate clamping portion 18. In another example, the projection 24 can be a separate pin 25 (shown in FIG. 2B) that can be inserted into a corresponding pin hole 50A-C (collectively referred to herein as "pin holes 50" or generally "pin hole 50") positioned adjacent to the engagement holes 46A-C along the engagement surfaces 40A-C. The pin 25 shown in FIG. 2B can be coupled to the elongate clamping portion 18. For example, the pin 24 includes a holder portion 21 configured to be inserted within the pin hole 50 and an abutment portion 23 configured to engage with the positioning groove 34 of the abutment blank 28 (as shown in FIG. 1). As seen in FIG. 2B, the holder portion 21 has a reduced diameter compared to the abutment portion 23; however, the diameter of the holder portion 21 can be less than, equal to, or greater than the diameter of the abutment portion 23.

First and second pin holes 50A, 50B are positioned around engagement openings 40A-C such that a first and second pin hole 50A, 50B are diametrically opposed from each other and a third pin hole 50C is positioned between and equidistant from the first and second pin holes 50A, 50B. Similarly, first and second projections 24A, 24B are positioned around an engagement openings 40A-C such that first and second projections 24A, 24B are diametrically opposed from each other and a third projection 24C is positioned between and equidistant from the first and second projections 24A, 24B. In an example, a line 51 extending between the center of the first and second pin holes 50A, 50B or the first and second projections 24A, 24B forms a right angle β with a line 53 intersecting line 51 and extending through the middle of the third pin hole 50C or the third projection 24C.

Figure 5A:
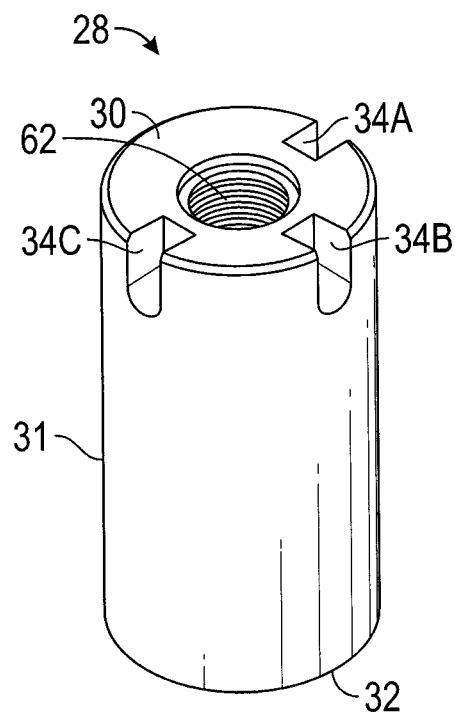
FIG. 5A is a perspective view of an abutment blank according to an example of the present application.

As discussed herein, the orientation of the pin holes 50A-C or projections 24A-C correspond to the positioning grooves 34A-C of the abutment blank 28 (as seen in FIG. 5A) such that there is only one way to couple the abutment blank 28 to the abutment holder 12.

Figure 3:
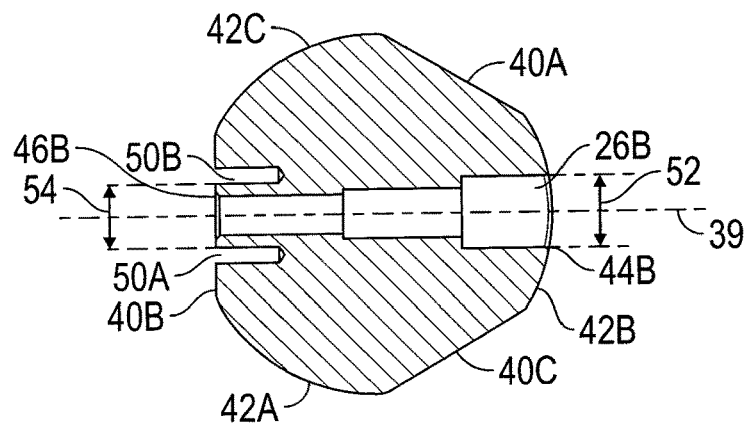
FIG. 3 is a cross-sectional view of the abutment holder along line 3-3 in FIG. 2B according to an example of the present application.

FIG. 3 is a cross-sectional view of the abutment holder 12 along line 3-3 in FIG. 2B. As seen in FIG. 3, the bore 26B has a stepped diameter. The maximum diameter 52 is the diameter of the receiving opening 44B and the minimum diameter 54 is the diameter of the engagement opening 40B.

Figure 4:
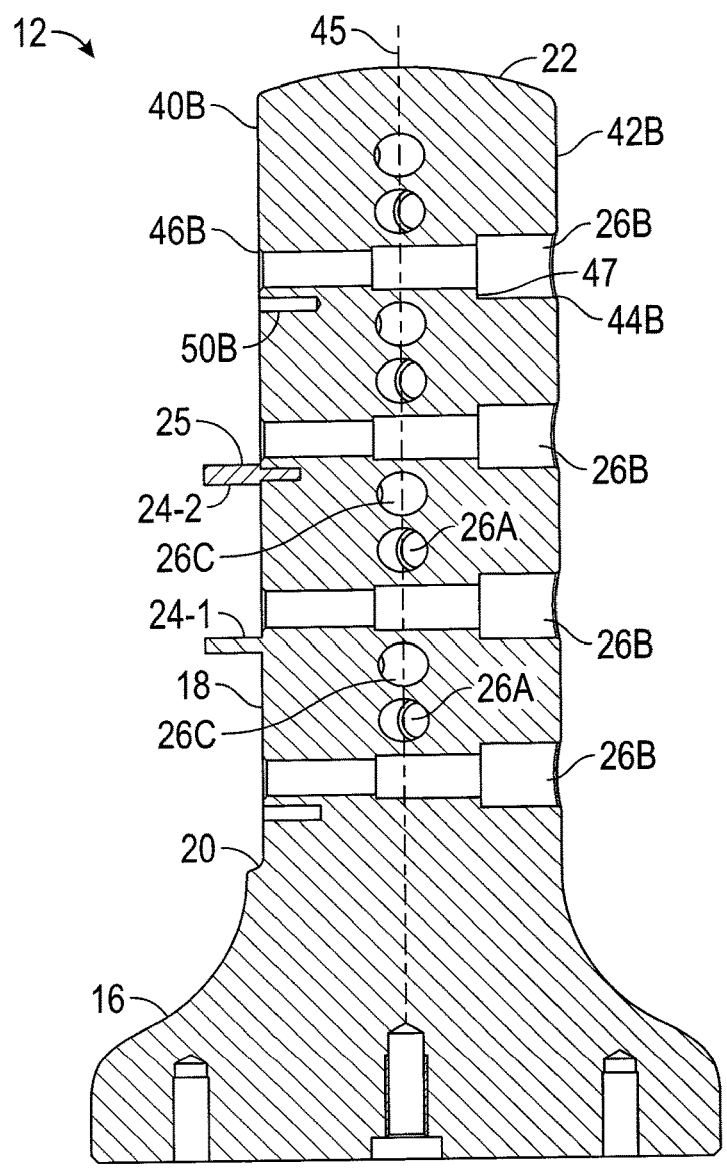
FIG. 4 is a cross-sectional view of the abutment holder along a longitudinal axis of the abutment holder according to an example of the present application.

FIG. 4 is a cross-sectional view of the abutment holder 12 along a longitudinal axis 45 according to an example of the present application. FIG. 4 illustrates how the bores 26A-C are staggered and spaced apart along the longitudinal axis and do not intersect with each other. Further, the bores 26 include a stop 47 that can engage with a surface of the engagement head 36 of the fastener 14. FIG. 4 illustrates projection 24-1 that is formed integrally with the abutment holder 12 and projection 24-2 that is formed as a separate pin 25 that is inserted into pin hole 50B.

Figure 5B:
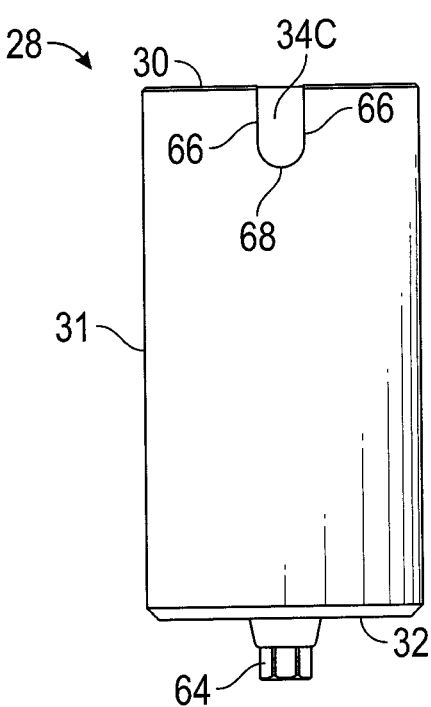
FIG. 5B is a side view of the abutment blank in FIG. 5A according to an example of the present application.
Figure 5C:
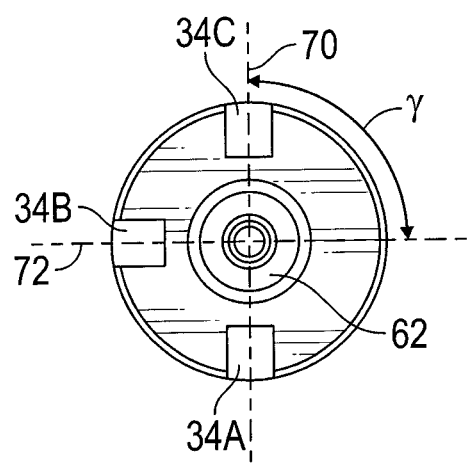
FIG. 5C is a top view of the abutment blank of FIGS. 5A and 5B according to an example of the present application.
Figure 6:
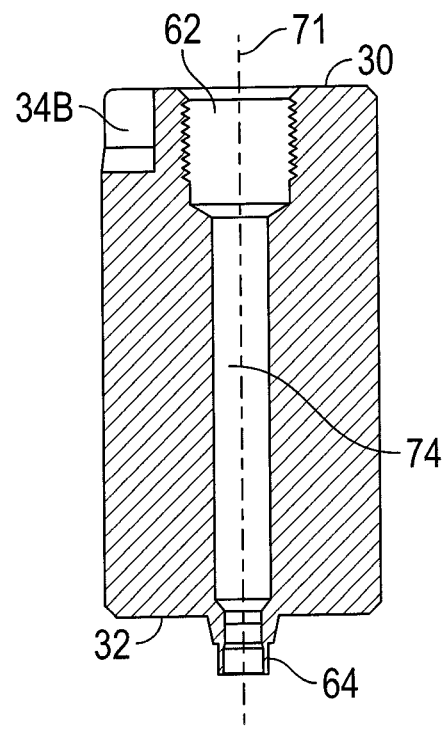
FIG. 6 is a cross-sectional view of the abutment blank according to an example of the present application.

FIG. 5A is a perspective view of an abutment blank 28, FIG. 5B is a side view of the abutment blank 28 in FIG. 5A, and FIG. 5C is a top view of the abutment blank 28 of FIGS. 5A and 5B. FIG. 6 is a cross-sectional view of the abutment blank 28 along a longitudinal axis 71.

The abutment blank 28 includes a body 31 extending from the contact end 30 to the implant engaging end 32. The contact end 30 defines at least one positioning groove 34 and an engagement bore 62. FIGS. 5A-C illustrate the abutment blank 28 including three positioning grooves 34A-C (collectively referred to herein as "positioning grooves 34" or generally "positioning groove 34"). By including three positioning grooves 34 that engage with three projections on the abutment holder provides a system where there is only one position possible for coupling the abutment blank 28 to the abutment holder. That is, with three positioning grooves 34 there is only one center point that can be accurately aligned and orientated with respect to the abutment holder. For example, while one or two positioning grooves will provide alignment guidance, three positioning grooves provides the most accurate alignment.

The engagement bore 62 includes a threaded portion 72 (e.g., female threads) and is configured to threadably engage with the threaded shaft 38 of the fastener 14 (as shown in FIG. 1). The abutment blank 28 can also include an unthreaded bore 74 extending form the engagement bore 62 to the implant engaging end 32. As seen in FIGS. 5B and 5C, the abutment blank 28 is coupled with the implant geometry 64; however, as discussed herein, the implant geometry 64 can be formed integral with the abutment blank 28 or as a separate component.

The positioning grooves 34 can include two flat surfaces 66 and a curved surface 68 connecting the two flat surfaces 66. In an example, the curved surface 68 can also be a flat surface. As seen in FIG. 5C, the positioning grooves 34 are positioned around the engagement bore 62 such that a first and second positioning grooves 34A, 34C are diametrically opposed form each other and a third positioning groove 34B is positioned between and equidistant from the first and second positioning grooves 34A, 34C. In an example, a line 70 extending between the center of the first and second positioning grooves 34A, 34C forms a right angle γ with a line 72 that intersects line 70 and extends through the middle of the third positioning groove 34B.

Figure 7:
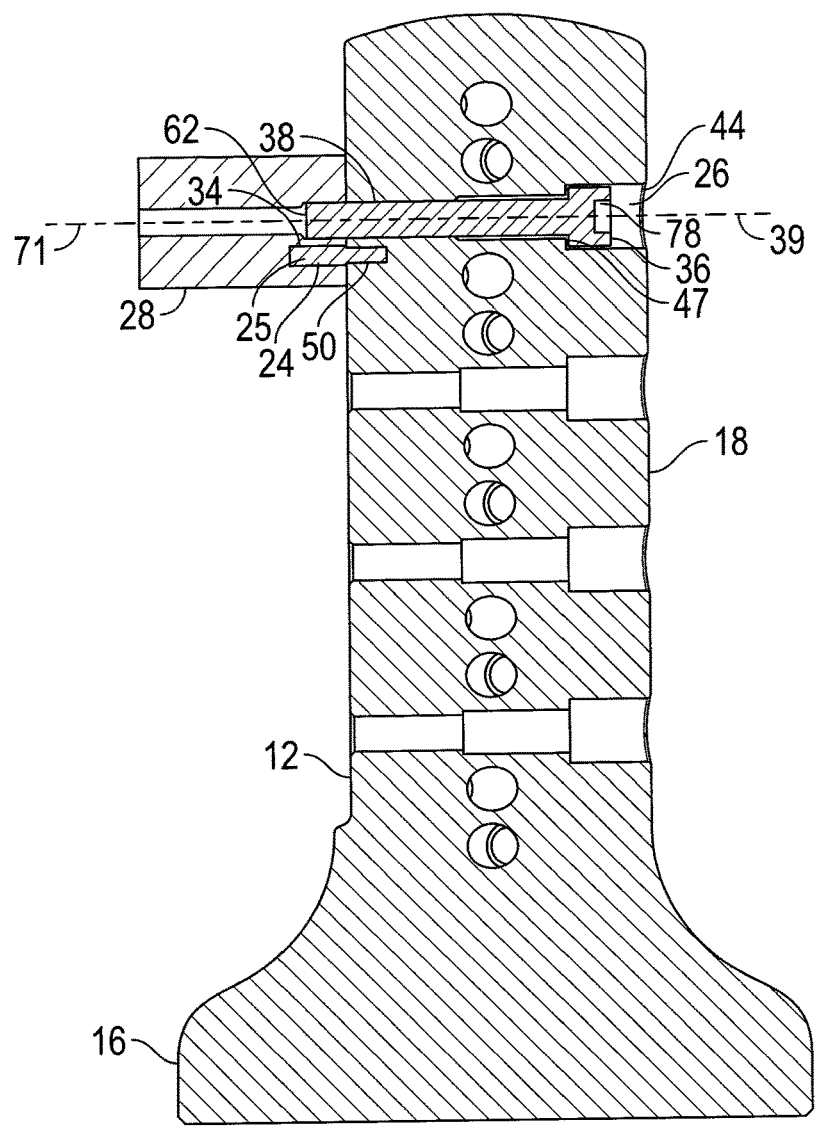
FIG. 7 is a cross-sectional view of the abutment blank coupled to the abutment holder according to an example of the present application.

FIG. 7 is a cross-sectional view of the abutment blank 28 coupled to the abutment holder 12. As seen in FIG. 7, the abutment blank 28 can initially be engaged with the abutment holder 12 along the elongate clamping portion 18 by engaging the projection 24 with the positioning groove 34 of the abutment blank 28. Subsequently, the fastener 14 can be inserted through the bore 26 and the threaded shaft 38 can become threadably engaged with the threaded bore 62 of the abutment blank 28 thereby securely coupling the abutment blank 28 to the abutment holder 12. As seen in FIG. 7, a surface of the engagement head 38 can contact the stop 47 of the bore 26. The engagement head 36 can include an engagement bore 78 that is configured to receive a tool for rotating the fastener 36. When the abutment blank 28 is coupled to the abutment holder 12, a center of the abutment blank 28 (or a center of the engagement bore 62 is directly aligned with the center of bore 26. In other words, engagement bore 62 and bore 26 are concentric to each other when the abutment blank 28 is coupled to the abutment holder 12. In other words, the longitudinal axis 71 of the abutment blank and the longitudinal axis 39 of the bore 26 are aligned when the abutment blank 28 is coupled to the abutment holder 12.

Figure 8:
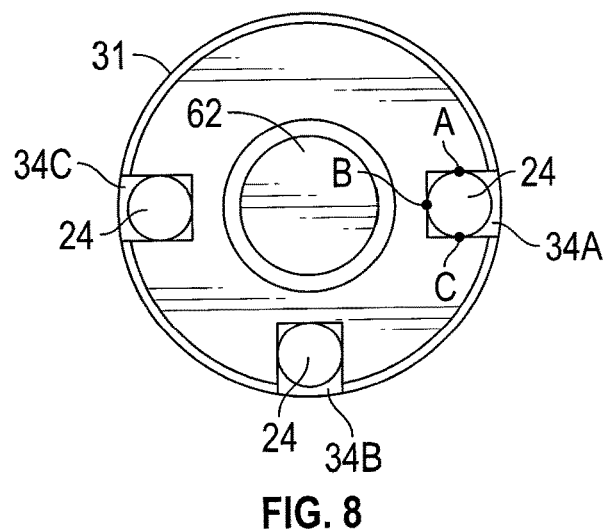
FIG. 8 is a cross-sectional view of the abutment blank coupled to the abutment holder, with some detail in FIG. 7 removed, according to an example of the present application.

FIG. 8 is a cross-sectional view of the abutment blank 28 coupled to the abutment holder 12 (shown in FIG. 7), with the fastener 14 of FIG. 7 removed. As seen in FIG. 8, the cross-section of the positioning grooves 34 includes three flat surfaces. The diameter of the positioning grooves 34 should correspond to the diameter of the projections 24 such that when the projections 24 are inserted into the positioning grooves 34, there are three points of contact "A," "B," and "C" on each of the projections 24. This provides the low mechanical tolerance between the abutment blank 28 and the abutment holder 12 and ensures that the position of the abutment blank 28 in the milling machine is the same every time.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the detailed description as examples or embodiments, with each claim standing on its own as a separate example, and it is contemplated that such examples can be combined with each other in various combinations or permutations. The scope of the invention should be determined with reference to the appended claims, along with the full scope of equivalents to which such claims are entitled.

The invention claimed is:

1. An abutment blank clamping system, comprising:
an abutment holder including a base portion and an elongate clamping portion extending from a first end adjacent the base portion to a second end, the elongate clamping portion, including:
at least one bore extending from a first side surface defining a first opening to a second side surface defining a second opening; and
at least one projection extending from the second side surface positioned adjacent to the second opening, the at least one projection configured to engage with the abutment blank;
an abutment blank having a body extending from a contact end to an implant engaging end, the abutment blank including at least one positioning groove and a threaded engagement bore extending from the contact end toward the implant engaging end, the contact end configured to contact the second side surface such that at least one bore of the abutment holder is aligned with the engagement bore of the abutment blank; and
a fastener including an engagement head and a threaded shaft, the fastener configured to extend completely within the at least one bore via the first opening and releasably couple with the threaded engagement bore to secure the abutment blank to the abutment holder.

2. The abutment blank clamping system according to claim 1, wherein the at least one projection includes a first projection, a second projection, and a third projection, the first, second, and third projections positioned around the second opening.

3. The abutment blank clamping system according to claim 2, wherein the first projection and the second projection are diametrically opposed from each other.

4. The abutment blank clamping system according to claim 3, wherein the third projection is positioned between and equidistant from the first projection and the second projection.

5. The abutment blank clamping system according to claim 1, wherein the second side surface is a flat surface extending along the elongate clamping portion from the first end to the second end.

6. The abutment blank clamping system according to claim 1, wherein the at least one bore includes a plurality of bores extending from the first side surface to the second side surface, the plurality of bores spaced apart along a longitudinal axis of the abutment holder.

7. The abutment blank clamping system according to claim 1, wherein the at least one projection is integral with the elongate clamping portion.

8. The abutment blank clamping system according to claim 1, wherein the at least one projection is a pin coupled to the elongate clamping portion.

9. The abutment blank clamping system according to claim 1, wherein the at least one positioning groove is configured to receive the at least one projection and the implant engaging end is configured to mate with a dental implant.

10. An abutment blank clamping system comprising:
- an abutment holder including a base portion and an elongate clamping portion having a longitudinal axis, the elongate clamping portion extending from a first end adjacent the base portion to a second end, the elongate clamping portion, including:
  - a first bore extending from a first engagement surface defining a first engagement opening to a first receiving surface defining a first receiving opening;
  - a second bore extending from a second engagement surface defining a second engagement opening to a second receiving surface defining a second receiving opening;
  - a third bore extending form a third engagement surface defining a third engagement opening to a third receiving surface defining a third receiving opening, wherein the first, second, and third engagement surfaces are equidistantly spaced about the longitudinal axis from each other; and
  - at least one projection positioned adjacent to each of the first, second, and third engagement openings, each projection configured to engage with a corresponding abutment blank; and
- a plurality of fasteners configured to extend through the first, second, and third bores and releasably couple with the corresponding abutment blanks.

11. The abutment blank clamping system according to claim 10, wherein along a cross-section of the elongate clamping portion perpendicular to the longitudinal axis the first, second, and third engagement surfaces are flat surfaces and the first, second, and third receiving surfaces are curved surfaces, and wherein each engagement surface is positioned between two receiving surfaces.

12. The abutment blank clamping system according to claim 10, wherein the first, second, and third bores are spaced apart along a longitudinal axis of the abutment holder.

13. The abutment blank clamping system according to claim 10, further including:
- at least one abutment blank having a body extending from a contact end to an implant engaging end, the at least one abutment including at least one positioning groove and an engagement bore extending from the contact end toward the implant engaging end.

14. An abutment blank clamping system, the abutment blank clamping system, comprising:
- an abutment holder including a base portion and an elongate clamping portion having a longitudinal axis, the elongate clamping portion extending from a first end adjacent the base portion to a second end, the elongate clamping portion, including:
  - a plurality of first bores extending from a first engagement surface to a first receiving surface, the plurality of first bores parallel to and extending through the longitudinal axis;
  - a plurality of second bores extending from a second engagement surface opening to a second receiving surface, the plurality of second bores parallel to and extending through the longitudinal axis; and
  - a plurality of third bores extending form a third engagement surface to a third receiving surface, the plurality of third bores parallel to and extending through the longitudinal axis,
- wherein the plurality of first bores, the plurality of second bores, and the plurality of third bores are spaced apart along the longitudinal axis such that they do not intercept each other.

* * * * *